Patented July 16, 1940

2,207,868

UNITED STATES PATENT OFFICE 2,207,868

HYDROGENATION CATALYST AND METHOD OF PREPARING THE SAME

Robert W. Martin, Wilmington, Del., assignor to Hercules Powder Company, Wilmington, Del., a corporation of Delaware No Drawing. Application January 25, 1938,
Serial No. 186,906

20 Claims. (Cl. 23—236)

This invention relates to improvements in catalytic hydrogenation, and more particularly to new forms of noble metal catalysts and their production, and to hydrogenation by the use of such catalysts.

The catalyst in accordance with this invention comprises an inert, porous support, impregnated with an adherent deposit of a noble metal oxide, which is immediately upon contact with hydrogen, reduced to a very active form of noble metal. The inert, porous support may consist of fine, porous materials, for example, diatomaceous earth, pumice, etc., or of porous granules of silica or alumina. It may also consist of a continuous, porous support, formed, for example, of a mass of silica granules bonded together. Such support, and the catalyst thereby produced, is described and claimed in my copending application, Ser. No. 753,132, filed November 15, 1934.

The inert, porous support is impregnated, in accordance with this invention, with a mixture of chloroplatinic or chloropalladous acid and an alkali metal nitrate, for example, sodium nitrate, potassium nitrate, lithium nitrate, etc., and is then heated to a temperature of about 300°–500° C., to effect reaction between the acid and the nitrate, with resulting formation of platinum oxide or palladium oxide. The material so produced is ready for use as a hydrogenation catalyst, since the oxide is immediately reduced to the metal upon contact with hydrogen.

Impregnation of the porous base or support I have found to be accomplished by reacting a concentrated, aqueous solution of the nitrate with a concentrated, aqueous solution of either chloroplatinic or chloropalladous acid. The nitrate should be employed in an amount which varies between the stoichiometric equivalent and about a 50% excess thereof. Six mols of sodium nitrate react with 1 mol of chloroplatinic acid. According to my process, the nitrate should be utilized in an amount between 6 and 9 mols for each mol of the chloroplatinic acid. Similarly, 4 mols of sodium nitrate react with 1 mol of chloropalladous acid, and according to my process the nitrate should be used preferably in amounts between four and six mols for each mol of chloropalladous acid.

The two compounds are, preferably, dissolved in the minimum amount of water possible. Desirably, complete solution is effected by heating the solution, and the hot solution is used to impregnate the porous support, which, desirably, has been heated to about the temperature of the solution. The impregnated carrier is then slowly heated, preferably in an electric oven, desirably to about 375°–400° C., although a temperature within the range of about 300° to about 500° C. may be used, and is held at this temperature for about one hour. A temperature higher than about 500° C. is undesirable, because of combination between the noble metal oxide formed and the silica of the bias or support, and also causes the formation of an inert catalyst and prevents the formation of an adherent deposit of the noble metal oxide. The impregnated carrier is then cooled, washed with water until free of soluble impurities, and dried. The porous support is now found to be impregnated with platinum oxide or palladium oxide, which is, however, in the presence of hydrogen, immediately reduced to a very active form of platinum or palladium.

As illustrative of the procedure for forming a catalyst in accordance with this invention, the following examples are given:

Example I

Filtros, which comprises a mass of silica granules bonded together with a synthetic silicate, broken into pieces 3 to 5 mesh, was thoroughly cleansed and dried. To 25 grams of this material was added a hot solution containing 6.8 grams of sodium nitrate and 1.6 grams of platinum in the form of chloroplatinic acid. This mixture was then placed in an oven and heated slowly to 400° C. and maintained at such temperature for about 40 minutes. The mixture was then cooled, washed and dried.

Example II

Ten grams of diatomaceous earth were mixed with a solution consisting of 5 cc. of chloroplatinic acid (0.4 g. of platinum per cc.), 5 grams of water and 5 grams of sodium nitrate. This solution barely moistened the diatomaceous earth after thorough mixing. The mixture was heated in an oven as in Example I, cooled, washed, and dried.

Example III

Ten grams of diatomaceous earth, 5 cc. of a solution containing 1 gram of palladium as chloropalladous acid, 3 grams of sodium nitrate, and 5 cc. of water were thoroughly mixed, heated to 400°–425° C. for 1 hour, cooled, washed, and dried.

The above, non-continuous catalysts are more useful in batch hydrogenation than in continuous hydrogenation, although they may be used in the latter procedure, if desired.

Hydrogenation may be accomplished with the use of the noble metal catalyst, in accordance with this invention, by placing the catalyst in a suitable supporting vessel or container and circulating the material to be hydrogenated, in liquid or vapor phase, past the catalyst, in the presence of hydrogen. Desirably, the current of hydrogen will also be caused to flow past the catalyst, and, in such cases, the flow of hydrogen may be either concurrent with, or, where the material is in liquid phase, counter-current to the flow of material to be hydrogenated. Uniform distribution of the material, if in liquid phase, over the catalyst, may be effected by spraying it, atomized by a current of hydrogen, from a suitable nozzle. Where the material to be hydrogenated is a solid, or a liquid of high viscosity, it may be dissolved in an inert solvent, for example, methyl, ethyl, propyl, isopropyl, or butyl alcohols, glacial acetic acid, gasoline, mixed solvents, etc., and hydrogenated in such solution. The hydrogenation will, desirably, be conducted at a temperature of from about 10° C. to about 60° C., although the use of any particular temperature is, in no way, essential to the procedure. The particular pressure employed is, likewise, non-essential, but a pressure of from atmospheric to about 1000 atmospheres may be used. The rate of hydrogenation may be controlled by regulating the hydrogen pressure.

Any material capable of hydrogenation, for example, vegetable oils, unsaturated fatty acids, olefins, aromatic hydrocarbons, derivatives of the latter, etc., may be hydrogenated in accordance with this invention by the use of the noble metal catalyst described above. Materials containing the abietyl radical, for example, rosin, abietic acid, esters thereof, such as methyl abietate, ethyl abietate, glyceryl abietate, glycol abietate, etc., abietyl alcohol, rosin oil, terpenes, such as pine oil, alpha-terpineol, alpha-terpinene, dipentene, pinene, polymerized terpenes, etc., may readily be hydrogenated by the above-described procedure, using the noble metal catalyst in accordance with this invention.

As illustrative of such hydrogenation procedure, the following examples are given:

Example IV

The catalyst described in Example I was placed in a glass container having a porous, false bottom of fritted glass, and a bottom inlet. The catalyst was covered with a solution containing 20% of methyl abietate in glacial acetic acid. Hydrogen was passed upward through the porous bottom for 6 hours at room temperature, a well-distributed spray of fine hydrogen bubbles being formed. The product, on separation from the acetic acid, showed 57% hydrogenation.

Example V

The catalyst described in Example II was shaken in a Burgess-Parr apparatus with various solutions, at room temperature and at 25–40 pounds hydrogen pressure. Typical results secured were as follows:

(a) With 25% ethyl abietate in glacial acetic acid, 79% saturation was obtained in 150 minutes.

(b) With 25% methyl abietate in glacial acetic acid, 64% saturation was obtained in 150 minutes.

(c) With 25% I wood rosin in ethyl alcohol solution, 72% saturation was obtained in 240 minutes.

Example VI

The catalyst described in Example III was shaken with rosin in alcohol solution, 2% of palladium, based on the rosin, being used, at room temperature and at 25–40 pounds pressure of hydrogen. After 120 minutes, 75% saturation of the rosin was obtained.

Example VII

Three Filtros discs, each 3½ inches in diameter and 1½ inches thick were cleaned, dried, and each impregnated with 70 cc. of solution containing 30 grams of sodium nitrate and 7.5 grams of platinum, as chloroplatinic acid. These impregnated discs were heated slowly to 400° C., held at this temperature for 90 minutes, cooled, washed free of soluble impurities, and dried. The discs were then cemented together along their peripheries only, and a solution containing 25% I wood rosin, in solution in ethyl alcohol, was circulated through the discs at the rate of 1000 cc. per hour, in the presence of a concurrent flow of hydrogen at room temperature. The rosin, on recovery from the solution, showed a saturation of 50% of both double bonds.

Applicant's catalyst is a marked improvement over the prior art. It is known, for example, from J. Am. Chem. Soc. 45, 2171–9 (1923) to prepare a platinum catalyst by the use of large excesses of sodium nitrate (705% excess), but no method of supporting said catalyst. The preparation of such catalyst in a molten state suggested no way of supporting the same when produced. Introduction of refractory supports in the fusion led to no useful result.

Said prior art catalyst is produced by the use of temperatures between 500–550° C. On the contrary, the catalyst in accordance with the present invention is produced at a temperature of 300–500° C., preferably 400° C., and I have found that heating to above 500° C. causes inactivity of the catalyst.

A real problem was present in the art prior to this invention. The only feasible methods available in the prior art for the hydrogenation of rosin consisted in the use of very high hydrogen pressures, i. e., about 4000 lbs. per sq. in., high temperatures, i. e., 180–220° C., and a base metal catalyst, particularly nickel. These conditions involved a high cost of plant and very hazardous working conditions, due to the high pressures and dangerous character of hydrogen explosions.

If a noble metal catalyst could be used, room temperature and very moderate pressures, e. g., 30–40 lbs. per sq. in., could be used, thus greatly reducing plant cost and danger of injury to life and limb. However, before this invention there was no known noble metal catalyst suitable for this purpose, due to the utter impossibility of reducing catalyst losses to a feasible point, when using a finely divided or colloidal catalyst. Catalysts useful in oxidation reactions, such as platinum gauze or platinized asbestos, showed no activity whatever for hydrogenation purposes. Catalysts on inert supports, but reduced with formaldehyde or formates showed only a moderate hydrogenation activity. The prior art Adams catalyst had good hydrogenation activity, but no method of supporting the same was known. The preparation of the Adams catalyst, as disclosed, in molten alkali nitrate fusion, suggested no way of supporting the same. Attempts to introduce refractory supports, e. g., asbestos, into the fused mass, were without result, for the reason that the noble metal oxide had no preferential affinity to form on the surface of the support and little or no firm adhesion to the support after formation.

Contrary to the above, my improved method produces a superior hydrogenation, noble metal catalyst of high activity, e. g., in the difficult hydrogenation of rosin, and a catalyst in which the noble metal adheres firmly and uniformly to the porous support material. Furthermore, the conditions of my process are critical to produce the improved noble metal catalyst. Temperatures in excess of the temperatures I use produce inactive catalysts. The large excesses of alkali nitrate used in the prior art render preparation of a catalyst uneconomical, since the use of a large excess of alkali nitrate could only be obtained by reducing the proportion of soluble noble metal compound present, due to the definitely limited solubility. Thus, the use of impregnation from solution is necessary and critical to obtain even distribution over the support material and thus obtain the microscopic film thickness necessary for firm adhesion to the support material.

I have found that when 50 grams of rosin and 150 cc. ethyl alcohol were shaken with the reduced platinum of the prior art catalyst under a pressure of 2–2½ atmospheres of hydrogen, a 48% saturation of the double bonds of the rosin resulted in 60 minutes, and continuation of the treatment for 3 hours produced only 49% saturation. On the other hand, with the process and catalyst in accordance with this invention, in which only 0.85 grams of platinum had been deposited upon an inert, porous base, and with like conditions of hydrogenation, there resulted 63.2% saturation in 25 minutes, 67.3% in 75 minutes, and 69.5% in 150 minutes.

The catalyst produced in accordance with this invention avoids the difficulties experienced by the use of prior art catalysts. It possesses a superior activity in the hydrogenation of rosin, large quantities of highly active catalyst, in form readily adapted for commercial hydrogenation may be prepared easily and conveniently, the improved catalyst adheres firmly and uniformly to the catalyst support and is readily filtrable to reduce handling and operating losses.

It will be understood that the examples and details of procedure hereinabove set forth are illustrative only and are not in limitation of the invention herein disclosed.

I have not specifically claimed, in this application, my herein described invention insofar as it relates to a procedure for the hydrogenation of unsaturated compounds and, in particular, abietyl compounds, since such forms the subject matter of, and is claimed in, my copending, divisional application, Serial No. 14,296, filed April 2, 1935.

This application constitutes a continuation-in-part of my application Serial No. 753,133, filed November 15, 1934, by me for Hydrogenation catalyst and method of hydrogenation.

What I claim and desire to protect by Letters Patent is:

1. The method of preparing a hydrogenation catalyst which includes impregnating an inert, porous support material with a concentrated aqueous solution of chloroplatinic acid and a concentrated aqueous solution of an alkali metal nitrate, heating the impregnated material at a temperature of from about 300° C. to about 450° C. to form platinum oxide, and extracting water-soluble impurities from the impregnated material, the ratio between the chloroplatinic acid and the alkali metal nitrate present being such that a deposit of platinum oxide firmly adherent to the support is formed.

2. The method of preparing a hydrogenation catalyst which includes impregnating an inert, porous support material with a concentrated aqueous solution of chloropalladous acid and a concentrated aqueous solution of an alkali metal nitrate, heating the impregnated material at a temperature of from about 300° C. to about 450° C. to form palladium oxide, and extracting water-soluble impurities from the impregnated material, the ratio between the chloropalladous acid and the alkali metal nitrate present being such that a deposit of palladium oxide firmly adherent to the support is formed.

3. The method of preparing a hydrogenation catalyst which includes impregnating an inert, porous support material with a concentrated aqueous solution of a noble metal compound, from the group consisting of platinum compounds and palladium compounds, and a concentrated aqueous solution of an alkali metal nitrate, heating the impregnated material at a temperature of from about 300° C. to about 450° C. to form a noble metal oxide, and extracting water-soluble impurities from the impregnated material, the ratio between noble metal compound and the alkali metal nitrate present being such that a deposit of noble metal oxide firmly adherent to the support is formed.

4. The method of preparing a hydrogenation catalyst which includes impregnating an inert, porous support material with a concentrated aqueous solution of a soluble platinum compound and a concentrated aqueous solution of an alkali metal nitrate, heating the impregnated material at a temperature of from about 300° C. to about 450° C. to form platinum oxide, and extracting water-soluble impurities from the impregnated material, the ratio between the platinum compound and the alkali metal nitrate present being such that a deposit of platinum oxide firmly adherent to the support is formed.

5. The method of preparing a hydrogenation catalyst which includes impregnating an inert, porous support material with a concentrated aqueous solution of a soluble palladium compound and a concentrated aqueous solution of an alkali metal nitrate, heating the impregnated material at a temperature of from about 300° C. to about 450° C. to form palladium oxide, and extracting water-soluble impurities from the impregnated material, the ratio between the palladium compound and the alkali metal nitrate present being such that a deposit of palladium oxide firmly adherent to the support is formed.

6. A hydrogenation catalyst comprising an inert, porous support material uniformly impregnated with an adherent deposit of noble metal oxide, from the group consisting of oxides of platinum and palladium, formed within the porous support material by the reaction of a concentrated aqueous solution of an alkali metal nitrate upon a concentrated aqueous solution of a water soluble noble metal compound, from the group consisting of platinum compounds and palladium compounds, at an elevated temperature not exceeding approximately 450° C.

7. A hydrogenation catalyst comprising an inert, porous support material uniformly impregnated with an adherent deposit of platinum oxide formed within the porous support material by the reaction of a concentrated aqueous solution of an alkali metal nitrate upon a concentrated aqueous solution of a water soluble platinum compound at an elevated temperature not exceeding approximately 450° C.

8. A hydrogenation catalyst comprising an inert, porous support material uniformly impregnated with an adherent deposit of palladium oxide formed within the porous support material by the reaction of a concentrated aqueous solution of an alkali metal nitrate upon a concentrated aqueous solution of a water soluble palladium compound at an elevated temperature not exceeding approximately 450° C.

9. The method of preparing a hydrogenation catalyst which includes impregnating an inert, porous support material with a concentrated aqueous solution of a water-soluble tetravalent platinum compound and a concentrated aqueous solution of an alkali metal nitrate in the proportion of about nine molar weights of nitrate to one atomic weight of tetravalent platinum present in the platinum compound, heating the impregnated material at a temperature of from about 300° C. to about 450° C. to form platinum oxide, and extracting water-soluble impurities from the impregnated material.

10. The method of preparing a hydrogenation catalyst which includes impregnating an inert, porous support material with a mixture of a concentrated aqueous solution of chloroplatinic acid and a concentrated aqueous solution of an alkali metal nitrate in the proportion of about nine molar weights of nitrate to one molar weight of chloroplatinic acid, heating the impregnated material at a temperature of from about 300° C. to about 450° C. to form platinum oxide, and extracting water-soluble impurities from the impregnated material.

11. The method of preparing a hydrogenation catalyst which includes impregnating an inert, porous support material with a concentrated aqueous solution of a water-soluble divalent palladium compound and a concentrated aqueous solution of an alkali metal nitrate in the proportion of about four molar weights of nitrate to one atomic weight of divalent palladium present in the palladium compound, heating the impregnated material at a temperature of from about 300° C. to about 450° C. to form palladium oxide, and extracting water-soluble impurities from the impregnated material.

12. The method of preparing a hydrogenation catalyst which includes impregnating an inert, porous support material with a mixture of a concentrated aqueous solution of chloropalladous acid and a concentrated aqueous solution of an alkali metal nitrate in the proportion of about four molar weights of nitrate to one molar weight of chloropalladous acid, heating the impregnated material at a temperature of from about 300° C. to about 450° C. to form palladium oxide, and extracting water-soluble impurities from the impregnated material.

13. The method of preparing a hydrogenation catalyst which includes impregnating an inert, porous support material with a concentrated aqueous solution of a water-soluble tetravalent platinum compound and a concentrated aqueous solution of an alkali metal nitrate in the proportion of about nine molar weights of nitrate to one atomic weight of tetravalent platinum present in the platinum compound, heating the impregnated material at a temperature of about 400° C. to form platinum oxide, and extracting water-soluble impurities from the impregnated material.

14. The method of preparing a hydrogenation catalyst which includes impregnating an inert, porous support material with a concentrated aqueous solution of a water-soluble palladium divalent compound and a concentrated aqueous solution of an alkali metal nitrate in the proportion of about four molar weights of nitrate to one atomic weight of divalent palladium present in the palladium compound, heating the impregnated material at a temperature of about 400° C. to form palladium oxide, and extracting water-soluble impurities from the impregnated material.

15. The method of preparing a hydrogenation catalyst which includes effecting a reaction between a water-soluble noble metal compound, from the group consisting of platinum compounds and palladium compounds, and an alkali metal nitrate by bringing the reactants together in concentrated aqueous solution, in amounts between about stoichiometrically equivalent amounts for a reaction to produce a noble metal nitrate and about a 50% excess of the nitrate, and in the presence of an inert, porous support material, heating the reaction mixture in the presence of the support material to a temperature between about 300° C. to about 450° C. whereby water is removed from the mixture and an oxide of the noble metal is firmly and adherently deposited upon the support material, and removing the water-soluble impurities from the catalyst thus formed.

16. The method of preparing a hydrogenation catalyst which includes effecting a reaction between a water-soluble platinum compound and an alkali metal nitrate by bringing the reactants together in concentrated aqueous solution, in amounts between about stoichiometrically equivalent amounts for a reaction to produce platinum nitrate and about a 50% excess of the nitrate, and in the presence of an inert, porous support material, heating the reaction mixture in the presence of the support material to a temperature between about 300° C. and about 450° C., whereby water is removed from the mixture and an oxide of platinum is firmly and adherently deposited upon the support material, and removing the water-soluble impurities from the catalyst thus formed.

17. The method of preparing a hydrogenation catalyst which includes effecting a reaction between a water-soluble palladium compound and an alkali metal nitrate by bringing the reactants together in concentrated aqueous solution, in amounts between about stoichiometrically equivalent amounts for a reaction to produce palladium nitrate and about a 50% excess of the nitrate, and in the presence of an inert, porous support material, heating the reaction mixture in the presence of the support material to a temperature between about 300° C. to about 450° C., whereby water is removed from the mixture and an oxide of palladium is firmly and adherently deposited upon the support material, and removing the water-soluble impurities from the catalyst thus formed.

18. A hydrogenation catalyst comprising an inert, porous support material impregnated with an adherent, uniform deposit of noble metal oxide from the group consisting of platinum oxides and palladium oxides, formed upon and in the presence of the porous support material by the action, in situ, and at a temperature between about 300° C. to about 450° C. of a concentrated aqueous solution of an alkali metal nitrate upon a concentrated aqueous solution of a water-soluble, noble metal compound.

19. A hydrogenation catalyst comprising an inert, porous support material impregnated with an adherent, uniform deposit of platinum oxide formed upon and in the presence of the porous support material by the action, in situ, and at a temperature between about 300° C. to about 450° C. of a concentrated aqueous solution of an alkali metal nitrate upon a concentrated aqueous solution of a water-soluble platinum compound.

20. A hydrogenation catalyst comprising an inert, porous support material impregnated with an adherent, uniform deposit of palladium oxide formed upon and in the presence of the porous support material by the action, in situ, and at a temperature between about 300° C. to about 450° C., of a concentrated aqueous solution of an alkali metal nitrate upon a concentrated aqueous solution of a water-soluble palladium compound.

ROBERT W. MARTIN.

CERTIFICATE OF CORRECTION.

Patent No. 2,207,868. July 16, 1940.

ROBERT W. MARTIN.

It is hereby certified that error appears in the printed specification of the above numbered patent requiring correction as follows: Page 1, second column, line 2, for "400°" read --450°--; line 8, for the word "bias" read --base--; page 2, second column, line 7, for "75%" read --57%--; page 4, second column, line 8, claim 14, strike out "divalent" and insert the same before "palladium" in line 7, same claim; and that the said Letters Patent should be read with this correction therein that the same may conform to the record of the case in the Patent Office.

Signed and sealed this 17th day of September, A. D. 1940.

(Seal)

Henry Van Arsdale,
Acting Commissioner of Patents.